(12) United States Patent
Jones et al.

(10) Patent No.: US 7,788,382 B1
(45) Date of Patent: Aug. 31, 2010

(54) SERVER INITIATED SYNCHRONIZATION

(75) Inventors: David Jones, Roanoke, TX (US); Kiran Ganji, Irving, TX (US)

(73) Assignee: Good Technology, Inc., Santa Clara, CA (US)

( * ) Notice: Subject to any disclaimer, the term of this patent is extended or adjusted under 35 U.S.C. 154(b) by 624 days.

(21) Appl. No.: 10/107,032

(22) Filed: Mar. 26, 2002

(51) Int. Cl.
*G06F 15/16* (2006.01)
*G06F 15/173* (2006.01)

(52) U.S. Cl. .................................. 709/227; 709/239
(58) Field of Classification Search ................ 709/227, 709/230, 239; 455/515–517
See application file for complete search history.

(56) References Cited

U.S. PATENT DOCUMENTS

| | | | | |
|---|---|---|---|---|
| 4,748,439 | A * | 5/1988 | Robinson et al. | 340/146.2 |
| 6,098,100 | A * | 8/2000 | Wey et al. | 709/223 |
| 6,219,694 | B1 * | 4/2001 | Lazaridis et al. | 709/206 |
| 6,292,890 | B1 * | 9/2001 | Crisan | 713/2 |
| 6,304,870 | B1 * | 10/2001 | Kushmerick et al. | 707/4 |
| 6,449,722 | B1 * | 9/2002 | West et al. | 726/4 |
| 6,493,824 | B1 * | 12/2002 | Novoa et al. | 713/162 |
| 6,505,058 | B1 * | 1/2003 | Willey | 455/574 |
| 6,510,524 | B1 * | 1/2003 | Osborn et al. | 713/323 |
| 6,526,034 | B1 * | 2/2003 | Gorsuch | 370/338 |
| 6,665,711 | B1 * | 12/2003 | Boyle et al. | 709/219 |
| 6,763,384 | B1 * | 7/2004 | Gupta et al. | 709/224 |
| 7,606,936 | B2 * | 10/2009 | Mousseau et al. | 709/239 |
| 2002/0059299 | A1 * | 5/2002 | Spaey | 707/104.1 |
| 2002/0147836 | A1 * | 10/2002 | Flanagin | 709/238 |
| 2002/0177461 | A1 * | 11/2002 | Rosen et al. | 455/518 |
| 2003/0045273 | A1 * | 3/2003 | Pyhalammi et al. | 455/412 |
| 2003/0190937 | A1 * | 10/2003 | Karmi et al. | 455/574 |
| 2004/0198221 | A1 * | 10/2004 | Bin et al. | 455/41.1 |

* cited by examiner

*Primary Examiner*—Aaron Strange
(74) *Attorney, Agent, or Firm*—Knobbe Martens Olson & Bear, LLP

(57) ABSTRACT

A method and system is disclosed for starting a server-initiated synchronization session between a mobile device and a server system. The server system and the mobile device communicate through a first communication channel for the synchronization session. After detecting that a predetermined set of data items are ready to be synchronized with the mobile device, the server system sends a notification message informing the mobile device to start a synchronization session through a second communication channel. Once receiving an initiation message from the mobile device to start the synchronization session, the server system starts to send the data items to the mobile device through the first communication channel.

19 Claims, 3 Drawing Sheets

SERVER INITIATED SYNCHRONIZATION

BACKGROUND OF THE INVENTION

The present invention relates generally to computer software, and more particularly, to server initiated synchronization or communications between a wireless mobile device such as handheld PDAs and a data server.

The synchronization server is the intermediary between wireless clients such as the mobile devices and the Enterprise server used by a company hosting various enterprise content (e.g., email). In general the Enterprise end is equipped with servers having fast processors, enormous storage and will have little to be concerned about the memory and hardware capabilities. The clients on the other hand need to operate on limited processing power and generally have storage and efficiency constraints.

The synchronization server's primary responsibilities include keeping the clients in sync with the Enterprise content. It serves the clients with changes at the Enterprise server end when the client's request a synchronization operation. As such, temporarily warehousing (or storing) data items at a server system and then "synchronizing" the mobile device with the server system is a common setup for using many handheld devices.

Present systems and methods for replicating information from a server system to a user's mobile device are typically "synchronization" systems in which the user's data items are "pulled" from the server system in a batch each time the user desires to retrieve the information. There is another method referred to as "push" method in which the server system initiates the transfer of the data items without having any user-initiated command that causes the mobile device to receive the data items. The information is thus "pushed" onto the mobile device. In general, from the perspective of the server system, the push paradigm is a more automated, continuous, efficient and reliable system while the pull paradigm is a more passive way to provide information to the users.

What is needed is an efficient method for enabling a synchronization server to initiate a synchronization with a wireless device when the primary synchronization data channel does not support a mechanism for such. In the case where such a mechanism does not exist, a synchronization must always be initiated by the client. As such, the mobile client will not be aware nor updated with server-side changes until the client explicitly elects to perform a synchronization.

SUMMARY OF THE INVENTION

A method and system is disclosed for starting a server-initiated synchronization session between a mobile device and a server system. The server system and the mobile device communicate through a first communication channel for the synchronization session. After detecting that a predetermined set of data items are ready to be synchronized with the mobile device, the server system sends a notification message informing the mobile device to start a synchronization session through a second communication channel. Once receiving an initiation message from the mobile device to start the synchronization session, the server system starts to send the data items to the mobile device through the first communication channel.

The method and system provided by the present disclosure is extremely useful where the server system cannot notify the mobile device through its regular synchronization transport channel.

The server system also conveys detailed information of which database, record, and fields require synchronization in the notification message so that the client can determine whether it is in his or her interest at the time of receiving the notification message to initiate the synchronization session with the sync server. Only the modified data is then synchronized with the mobile device.

DESCRIPTION OF THE PREFERRED EMBODIMENT

Figure 1:
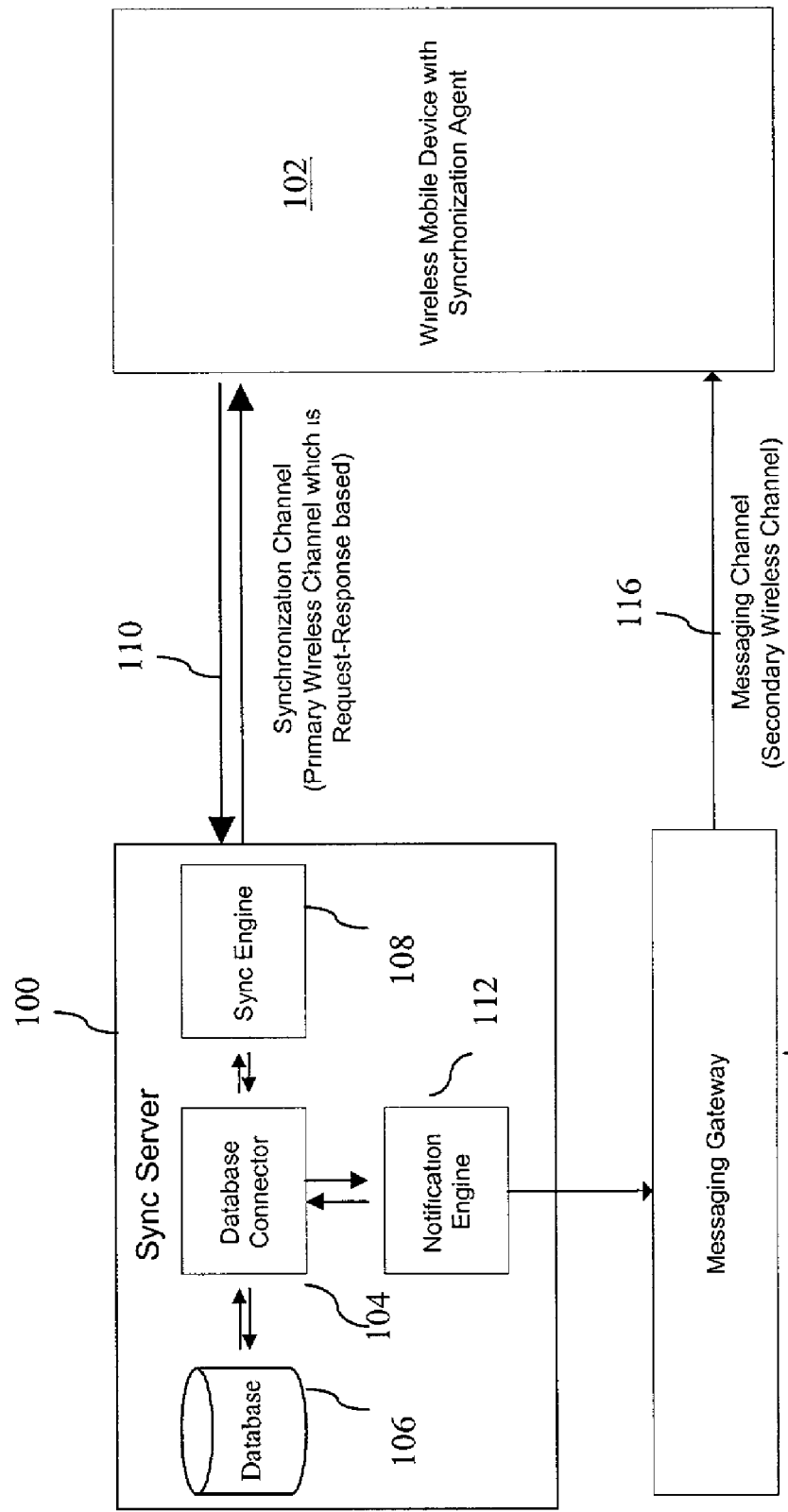
FIG. 1 illustrates a network configuration of a Sync Server operable with a message gateway and a mobile device through both a primary and secondary communication channels.

FIG. 1 illustrates communications between a Synchronization Server (or "Sync Server") 100 and a mobile device 102 which is equipped with a special task agent referred to as a Sync Agent. The Sync Server 100 further includes a Database Connector 104 which provides an access channel to one or more predetermined databases (e.g. Database 106) which contain data items (or, Enterprise content) that is desired to be synchronized with the mobile device 102. The Sync Server further includes a Sync Engine 108. For a typical synchronization session, the Sync Agent residing on the mobile device 102 must initiate the synchronization session with the Sync Engine 108 over a selected Synchronization Channel 110, which is a primary wireless communication channel. The transport type of the communications between the Sync Engine 108 and the mobile device is a "Request-Response" based form. That is, when the mobile device (or, the client) wishes to upload its data items with the Sync Server 100 or wishes to download server-side data to itself, it will have to initiate a request to the Sync Server 100, and then through responses from the Sync Server, the synchronization process proceeds. In some situations, only the mobile device is capable of initiating message communications over the primary channel, and the Sync Server needs to find a way to ask the mobile device to start the synchronization session. In the present disclosure, a secondary communication channel is used for the Sync Server to inform the mobile device that a synchronization session can be initiated if the user so desires.

In one example, the Sync Server 100 is constantly aware of changes made to the Database 106, and it is possible to further notify the mobile device 102 about the changes. Through a notification mechanism referred to as the Notification Engine 112, the Sync Server 100 can compose and send a message to a Messaging Gateway 114. According to one example of the present invention, the Messaging Gateway 114 uses a secondary or separate communication channel 116 which is dedicated to provide delivery of messages to the wireless mobile device 102.

Figure 2:
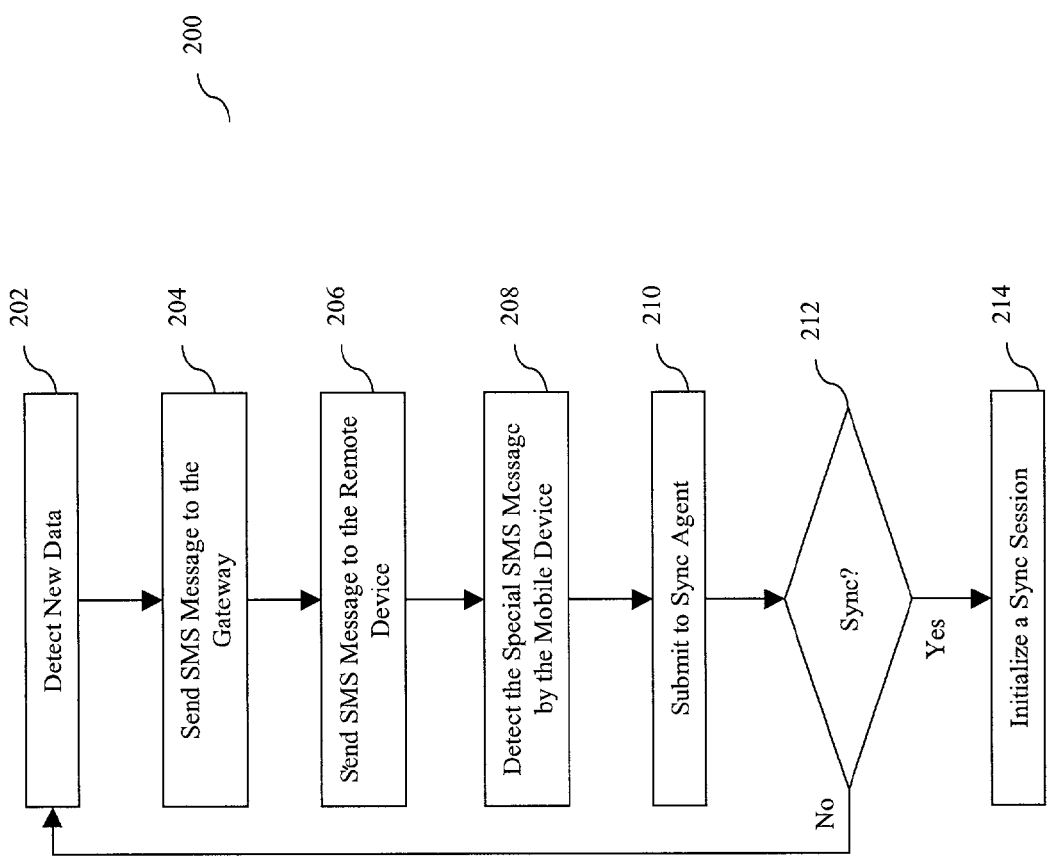
FIG. 2 is a flow diagram for completing a server initiated synchronization process.

FIG. 2 illustrates a flow diagram 200 demonstrating the message communication between the Sync Server 100 and the mobile device 102. In this embodiment, when the Sync Server detects that new data items are modified (added to or deleted from the database, or changed) pertaining to a particular user in step 202, the Notification Engine 112 composes and submits a notification message conforming to the Short Messaging Service (SMS) protocol in step 204 to a gateway module such as the SMS Messaging Gateway 114. The contents of this special SMS message contains a unique key identifying that its content is different from that of a typical SMS message. This unique key indicates that this SMS message is a notification message to "wake up" the mobile device to start the synchronization session with the Sync Server. Furthermore the notification message contains an indication of which database that the new data item has been added or modified. In addition, it may further specify exactly which record and which field of the database has been changed. One sample format of the special SMS message is shown below:

Notification:=<uniquekey>1*<databaseFlag>
UniqueKey:="U0J9g8o3W2Jq8o::"
DatabaseFlag:="a"|"m"|"d"|"t"

wherein the message indicates that it is a notification message, and databases identified by "a", "m", "d", and "t" are ready to be synchronized.

In step 206, the gateway module 114 sends out the SMS message destined for the mobile device through the secondary wireless communication channel 116. The mobile device, having an SMS Notification Listener, may screen each incoming SMS message and look for the unique key (step 208). Once the SMS message arrives, it will submit to a Sync Agent in the mobile device (step 210). The SMS message contains more details about the changes of pertinent data items. For example, the message may include information about which data items have been added or modified, or which data items have been eliminated from the synchronization session. It is understood that this special SMS message is limited in its capacity, and a summary of details may be provided instead of all the details. It is also understood what level of detail needs to be included can be programmed by the user.

The Sync Agent reviews the relevant database, record, and field that the Sync Server wishes to synchronize. At this time, based on preferences of the user or the rules set forth by the user, the Sync Agent may elect or not elect to synchronize with the Sync Server the data items the message has indicated (step 212). The user has a dominant right to appropriately configure the interaction between the Sync Server and the mobile device so that the Sync Server will only contact the mobile device if certain selected data items have been altered. If the Sync Agent elects to proceed with the synchronization, it initiates a synchronization session with the Sync Server in step 214 by making a request over the Synchronization Channel 110 to the Sync Engine, and thereby continuing synchronization as it would normally.

Furthermore, the present disclosure allows one to inherit beneficial features of existing messaging channels. For example, the above described server initiated synchronization can be combined with other messaging mechanisms such as those providing for acknowledgement of message receipt or message retries to guarantee data delivery for wireless mobile devices when they are out of range or turned off. It is also understood that although an SMS message is used as one illustrative example above, other notification mechanism using a secondary channel is fully contemplated.

In a typical database hierarchy, the database contains multiple records, and each record contains multiple fields and their sub-fields. In order to further increase the efficiency of the synchronization, it is important to allow the clients to select only a subset of the available fields from the Enterprise content. The selected fields or sub-fields will then be the only items to be synchronized by the synchronization server, thereby avoiding synchronizing the entire record. This reduces the amount of data transferred during synchronization at any point of time, and does not swamp the client devices with unwanted or unchanged fields of the selected records. This further enables the user to specify his choice of fields to be selected from the available set of fields in the Enterprise content.

Figure 3:
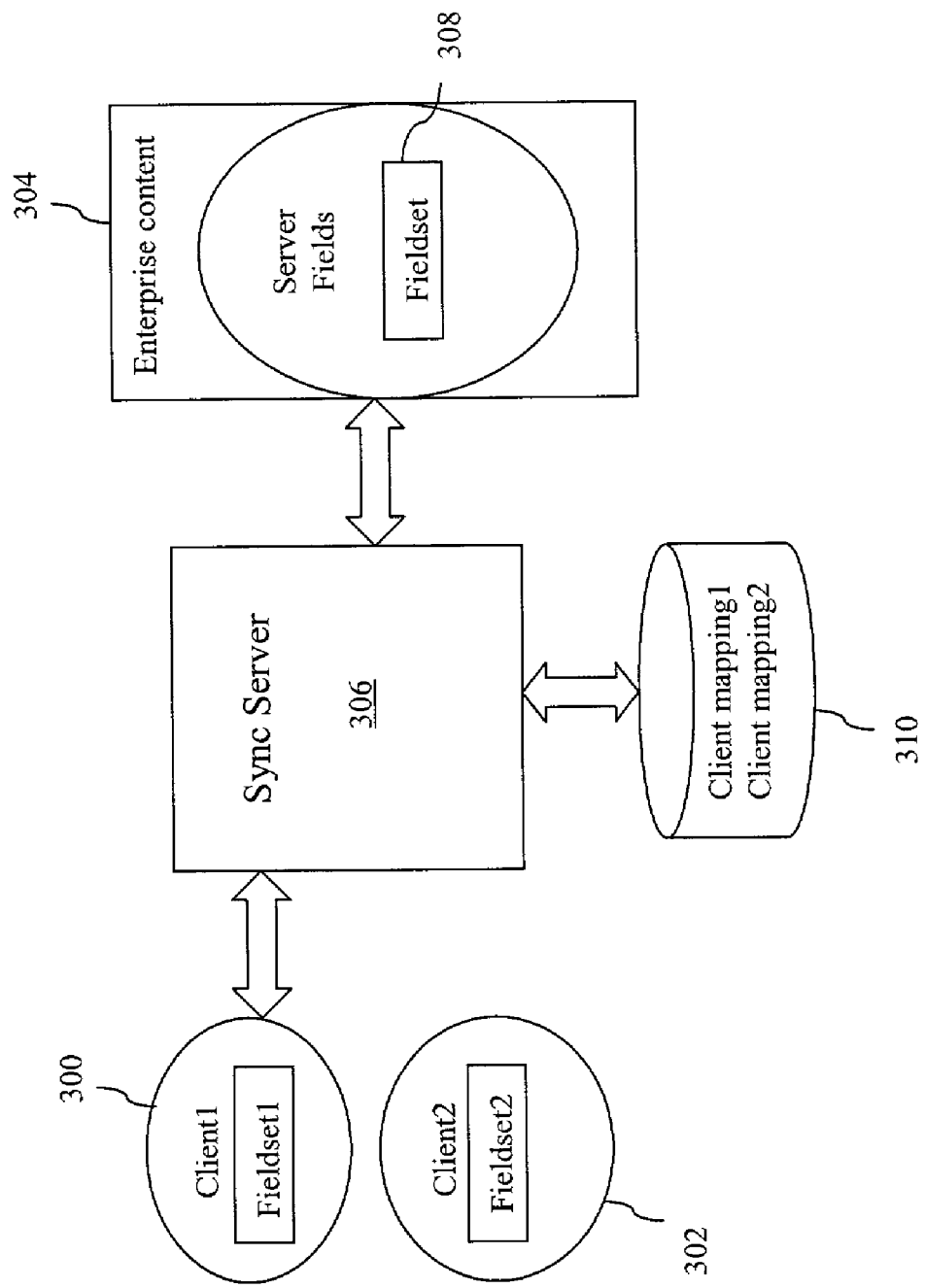
FIG. 3 illustrates a network configuration of a Sync Server operable with other components and a mobile device for implementing a sub-record level synchronization process.

FIG. 3 illustrates two different users with clients/mobile devices (300 and 302) trying to synchronize with the Enterprise content at an Enterprise server 304 through an intermediate Sync Server 306. The Enterprise server 304 may contain large data items that are quantifiable into a record identified as a Fieldset 308. A record is essentially the field and value representation of any Enterprise content. The user however may want to synchronize only a set of fields of a record (e.g., Fieldset1 and Fieldset2) due to various considerations such as personal convenience, personal preference, ease of use, download/upload efficiency, reduction in air-time costs, or the memory constraints on wireless devices, etc. These considerations can be represented by programmed preferences stored as mapping tables 310 (e.g., Client mapping1/Client mapping2) and maintained by the Sync Server 306. Subsequently, when a synchronization session is requested by the client, the Sync Server 306 retrieves the mapping information for that particular user and synchronizes only the selected fields as chosen by that particular client.

The following sample mapping table shows contents representing the users' selection of different fields for an email record.

| UserID | ClientTag | ServerTag | Database Type |
|---|---|---|---|
| D2LJSDFDF3323LJSDFF | T | TO | MAIL |
| D2LJSDFDF3323LJSDFF | F | FROM | MAIL |
| D2LJSDFDF3323LJSDFF | S | SUBJECT | MAIL |
| D2LJSDFDF3323LJSDFF | B | BODY | MAIL |
| D2LJSDFDF3323LJSDFF | I | TIME | MAIL |
| YLJWQEDFDF3323LJSD | T | TO | MAIL |
| YLJWQEDFDF3323LJSD | F | FROM | MAIL |
| YLJWQEDFDF3323LJSD | S | SUBJECT | MAIL |
| TRTWQEDFDF3323LJSD | F | FROM | MAIL |
| ... | | | |

As shown, the user is identified by an identification code (i.e., UserID), the database for the email record is identified as a Mail database type, and each field of the mail record is represented by a single character tag such as a "F" for the field "From." It is also understood that each user can maintain a separate field-mapping table for different mobile devices if needed.

The Sync Server only communicates with the mobile devices in terms of the client tags, which are often small to save and transfer, thus saving bandwidth over the air. On the other hand, the Sync Server can communicate with Enterprise servers using server tags since there are no capacity restraints. Because of the small size of the field tags, it becomes possible to implement another filtering mechanism at the mobile device end to allow the user to reject certain data items. Other than the primary synchronization preferences selection made at the Sync Server end, a simple program can be installed on the mobile device as a secondary synchronization preference selection mechanism to allow the mobile user further accept or reject synchronization initiated by the Sync Server. For example, for an address record in the user's phone book, the user may decide through the primary synchronization preference selection that a synchronization may be initiated if the phone number field in the address record is changed. However, for various reasons, the user at a particular day, he does not want to synchronize with the address record if only the phone number is changed. If so, he can invoke the secondary synchronization preference selection mechanism on the mobile device to change this so that when the Sync Server pushes a notification message over (e.g., SMS message), the mobile device will stay dormant and will not initiate a synchronization session.

While sending information back and forth between the Sync Server 306 and the mobile device 300 or 302, it is important that minimum data is transferred so that the bandwidth is not wasted. Synchronization protocols such as SyncML specifies the protocol and specification for the data to be synchronized between clients and a SyncML compliant server such as the Sync Server in FIG. 1 or 3. Although the present disclosure uses SyncML as one example, it is understood that the other similar protocols can be applied with the method and system disclosed here. The SyncML may specify that the data to be synchronized is a VCAL, VCARD or of other formal types. The formal definition of data works well for the Enterprise content. For example, AddressBook data can be in VCARD format. But often the Enterprise data cannot be put into a particular format. It thus lacks an efficient and consistent method for embedding any type of data into an easily constructable and easily readable format such as name and value pairs separated by a delimiter.

The present disclosure implements a generic data format (referred to as a "name tag") constructed as a continuous stream of name value pairs (e.g., name1=value1; name2=value2), which is embedded in SyncML messages exchanged between the Sync Server and mobile device. The name tag definitions can be saved in a memory space 310 (FIG. 3) operable with the Sync Server. A typical SyncML message may look like the following:

```
<?xml version="1.0" encoding="UTF-8"?>
<SyncML>
    <SyncHdr>
        <VerDTD>1.0</VerDTD>
        <VerProto>SyncML/1.0</VerProto>
        <SessionID>1</SessionID>
        <MsgID>1</MsgID>
        <Target>
            <LocURI>15733843</LocURI>
        </Target>
        <Source>
            <LocURI>15733843</LocURI>
        </Source>
        <Cred>
            <Meta><Type>auth-basic</Type></Meta>
            <Data>amtlbGxlcjpqa2VsbGVyOjE1NzMzODQz</Data>
        </Cred>
        <Meta><MaxMsgSize>32764</MaxMsgSize></Meta>
    </SyncHdr>
    <SyncBody>
        <Status>
            <CmdID>1234</CmdID>
            <MsgRef>1</MsgRef>
            <CmdRef>1234</CmdRef>
            <Cmd>Sync</Cmd>
            <Data>200</Data>
        </Status>
        <Sync>
            <CmdID>123456</CmdID>
            <Add><CmdID>1234</CmdID>
                <Item>
        <Source><LocURI>1$$1013179568492</LocURI></Source>
                    <Data></Data>
                </Item>
            </Add>
        </Sync>
```

-continued

```
        <Final />
    </SyncBody>
</SyncML>
```

The actual data is embedded in between <Data> and </Data> and within the <Item> and </Item> tag. For example, the data is stored in the following way:

```
<Item>
    <Source><LocURI>1$$1013179568492</LocURI></Source>
        <Data>T=someone@somewhere.com;S=Subject
        line;R=F;P=2;L=I;F=fromaddress@someotherplace.com;Y=here is
        the body of the
        mail
        containing no delimiters
        </Data>
</Item>
```

The name-value pair is delimited in the above example with a semicolon (;) although the Sync Server and the mobile device can determine other delimiters to use. The conventional method for determining on a delimiter is through searching the data portion and finding the least possible symbol to be chosen. This asks for a data searching process which is further clogging the use of processing power and bandwidth. Another alternative is to use a predetermined escape symbol such as a forward or back slash to indicate the occurrence of the delimiter is actually not functioning as a delimiter in the particular context. This also requires multiple entries of these predetermined symbol to be transmitted between the Sync Server and the mobile device, consequently adding considerable overhead to the data. According to the present disclosure, a prefix or delimiter indicator is added indicating the number of delimiters the data portion has to skip to reach the end of the value part with a true delimiter. Therefore, the only addition is the number of delimiters and thus reduces the overhead to the data transmitted in the air. An example is shown below to illustrate one embodiment of adding a delimiter indicator "[ ]":

```
<Item>
    <Source><LocURI>1$$1013179568492</LocURI></Source>
        <Data>T=someone@somewhere.com;S=Subject
        line;R=F;P=2;L=I;
        F=fromaddress@someotherplace.com;[2]Y=here is the
        body of the mail;with;two semicolons;
        </Data>
</Item>
``` wherein "[2]" indicates that there are two semi-colons need to be ignored and the third one is the true delimiter.

The main advantage of this generic format for recognizing delimiters is that it obviates the need for any specific requirement for reading and writing different formats of data. Any data at the Enterprise end can be fit into the name-value pairs, making the format disclosed herein a compelling and comprehensive means for exchanging data in the SyncML messages. It is also understood that this method for recognizing delimiters can be applied in any information exchange session, and is not limited to a server-initiated synchronization session.

While the method and system has been particularly shown and described with reference to the preferred embodiment thereof, it will be understood by those skilled in the art that various changes in form and detail may be made therein without departing from the spirit and scope of the invention, as set forth in the following claims.

What is claimed is:

1. A method comprising:
   detecting at a server system that data items are ready to be synchronized with a mobile device;
   attempting to initiate message communication with the mobile device via a first communication channel;
   determining that the server system is unable to initiate message communication with the mobile device via the first communication channel;
   sending a notification message through a second communication channel informing the mobile device to start a synchronization session via the first communication channel upon determining that the first communication channel is unavailable, wherein the notification message includes a unique key to wake up the mobile device and an indication of which of one or more modified fields within records of a database in the server system that are to be synchronized during the synchronization session;
   receiving an initiation message from the mobile device to start the synchronization session; and
   commencing the synchronization session by sending the data items to the mobile device through the first communication channel.

2. The method of claim 1 wherein the detecting further includes detecting a user preference defining one or more triggers for starting the server-initiated synchronization session.

3. The method of claim 1 wherein the unique key identifies the notification nature of the message.

4. The method of claim 1 wherein the notification message contains an indication of at least one database in the server system in which the data items have been added.

5. The method of claim 4 wherein the notification message contains a indication of at least one added record of the indicated database.

6. The method of claim 5 wherein the notification message contains an indication of at least one added field of the indicated record.

7. The method of claim 6 wherein each field of the record is represented as a client tag.

8. The method of claim 1 further comprising:
   detecting the notification message by the mobile device; and
   determining by the mobile device whether the synchronization session needs to be started based on information contained in the notification message.

9. The method of claim 1 wherein in the synchronization session the data items are sent as one or more name-value pairs.

10. The method of claim 9 wherein the name-value pair indicates a predetermined delimiter to be the end thereof by indicating a number of delimiters to be skipped.

11. The method of claim 10 wherein the number of delimiter to be skipped is indicated in a prefix element to the name-value pair.

12. The method of claim 1 wherein the second communication channel is established through messages conforming to Short Message Services protocol.

13. A method comprising:
   detecting at a server system that data items are ready to be synchronized with the mobile device by detecting at least one trigger set by a user for starting server-initiated synchronization session;
   attempting to initiate message communication with the mobile device via a first communication channel;
   determining that the server system is unable to initiate message communication with the mobile device via the first communication channel is unavailable to the mobile device;
   sending a notification message through a second communication channel informing the mobile device to start a synchronization session via the first communication channel, the second communication channel being established through messages conforming to Short Message Services protocol, wherein the notification message includes a unique key to wake up the mobile device and an indication of which of one or more modified fields within records of a database in the server system that are to be synchronized during the synchronization session;
   receiving an initiation message from the mobile device to start the synchronization session; and
   commencing the synchronization session by sending the data items to the mobile device through the first communication.

14. The method of claim 13 wherein the notification message contains an indication of at least one database in the server system in which the data items have been added.

15. The method of claim 14 wherein the notification message contains an indication of at least one added record of the indicated database.

16. The method of claim 15 wherein the notification message contains an indication of at least one added field of the indicated record.

17. The method of claim 13 wherein in the synchronization session the data items are sent as one or more name-value pairs.

18. The method of claim 17 wherein the name-value pair indicates a predetermined delimiter to be the end thereof by indicating a number of delimiters to be skipped.

19. The method of claim 18 wherein the number of delimiters to be skipped is indicated in a prefix element to the name-value pair.

* * * * *